United States Patent
Sailors

(10) Patent No.: US 6,840,775 B2
(45) Date of Patent: Jan. 11, 2005

(54) FETAL EDUCATOR STRAP

(75) Inventor: Douglas W. Sailors, Nashville, TN (US)

(73) Assignee: Dahlman Industries, Inc., Nashville, TN (US)

(*) Notice: Subject to any disclaimer, the term of this patent is extended or adjusted under 35 U.S.C. 154(b) by 0 days.

(21) Appl. No.: 10/388,937

(22) Filed: Mar. 14, 2003

(65) Prior Publication Data

US 2004/0180318 A1 Sep. 16, 2004

(51) Int. Cl.$^7$ ............................................. G09B 19/00
(52) U.S. Cl. ..................................... 434/236; 434/262
(58) Field of Search ................................. 381/334, 335, 381/301, 332, 333; 434/236, 262, 319, 433

(56) References Cited

U.S. PATENT DOCUMENTS

| | | | |
|---|---|---|---|
| 4,768,612 A | 9/1988 | Hodson | |
| 4,798,539 A | 1/1989 | Henry et al. | |
| 4,830,007 A | 5/1989 | Stein | |
| 4,898,179 A | 2/1990 | Sirota | |
| 4,934,998 A | 6/1990 | Thomas, Jr. | |
| 5,033,968 A | * 7/1991 | Hecht | 434/262 |
| 5,109,421 A | 4/1992 | Fox | |
| 5,385,153 A | 1/1995 | Jamieson et al. | |
| 5,491,756 A | 2/1996 | Francais | |
| 5,699,558 A | 12/1997 | Min | |
| 5,764,776 A | 6/1998 | Francais | |
| 5,873,736 A | * 2/1999 | Harrison | 434/322 |
| 5,898,787 A | 4/1999 | Stanford | |
| 5,913,834 A | 6/1999 | Francais | |
| 6,097,822 A | 8/2000 | Min | |
| 6,169,814 B1 | * 1/2001 | Johnson | 381/333 |
| 6,206,821 B1 | 3/2001 | Rhee | |

* cited by examiner

Primary Examiner—Kurt Fernstrom
(74) Attorney, Agent, or Firm—Pitts & Brittian, P.C.

(57) ABSTRACT

A fetal educator strap includes an elongated belt defining an interior surface and an exterior surface. A pouch is slidably mounted upon the exterior surface of the belt. A sound generator, including a speaker, is contained within the pouch. The speaker is directed toward the interior surface of the belt. In this manner the pouch containing the sound generator is slidable around the circumference of the belt to the optimum position as determined by the user.

4 Claims, 3 Drawing Sheets

FETAL EDUCATOR STRAP

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to learning systems for fetuses while in utero.

More particularly, this invention pertains to a system for moving sound transmitters to positions most properly aligned with an unborn baby's ears.

2. Description of the Related Art

The importance of neurological growth of unborn babies resulting from audio stimulation while still in the womb has been well established. There have been numerous devices developed for conveying sounds to a fetus through a mother's abdomen by attaching sound transmitters on support belts worn by the mothers. U.S. Pat. No. 4,934,998, issued to Thomas, Jr., discloses a belt that carries a portable tape recorder. A pair of audio transducers is mounted in the belt to direct sounds toward the womb. U.S. Pat. No. 4,798,539, issued to Henry et al, discloses a belt that includes a pocket for containing a portable cassette recorder or, alternatively, pockets for containing speakers.

However, a mother's abdomen and clothing absorb the generated sounds, reducing the volume and clarity of the sound reaching the fetus, particularly because a fetus does not stay in one position all the time. In fact, a fetus can move around to substantially different positions within the womb. For educational material, such as classical music, literature and other neurological stimulating transmissions, it is important that the fetus hears with clarity the transmitted sounds. Obviously, while louder volume is an option, but it may also become disruptive to the mother and others around her. It is preferable to provide a system for directing the transmissions toward the ears of the fetus in order to minimize the overall volume of the transmissions while maximizing the relative volume and clarity heard by the fetus.

A mother is aware of the position of the fetus she is carrying, particularly by knowing where the feet and/or head are located. Accordingly, the mother can direct the sound transmissions toward the head of the fetus if she is provided with an easily adjustable support system for the sound generator.

BRIEF SUMMARY OF THE INVENTION

According to one embodiment of the present invention, an elastic belt, having a first end and an opposing second end is provided for extending around the abdomen of a pregnant woman. Adjustable attaching mechanism is provided to permit adjustment of the elastic belt to a tension level that is comfortable for the woman. A pouch, adapted to contain a sound generating device, includes a loop through which the belt is slidably received to permit the pouch to be positioned at any location along the belt.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
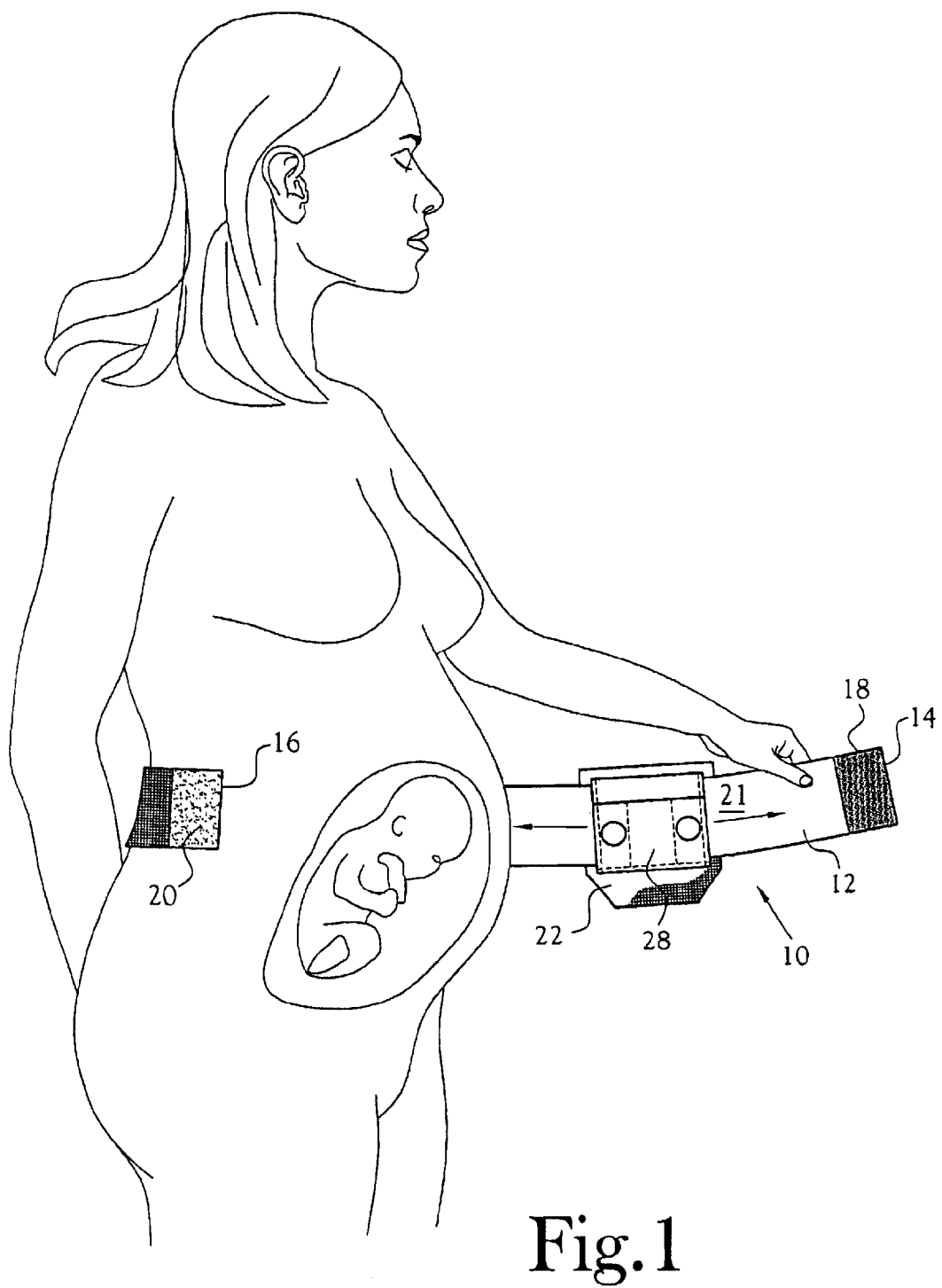
FIG. 1 is a perspective view of a pregnant woman applying a fetal educator strap in accordance with the present invention.
Figure 2:
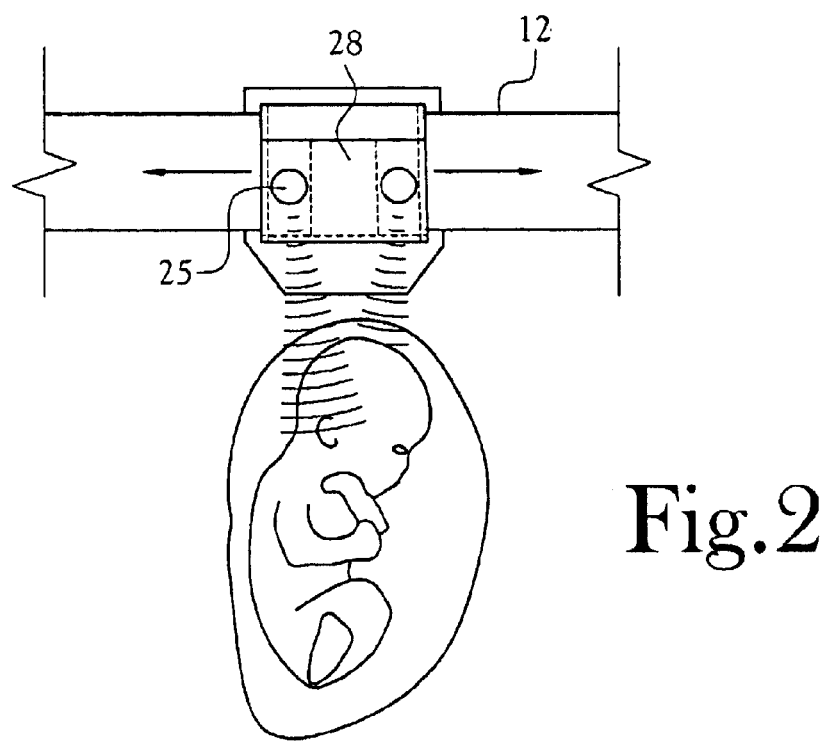
FIG. 2 is a partial elevation view of a fetal educator strap in accordance with the present invention.
Figure 3:
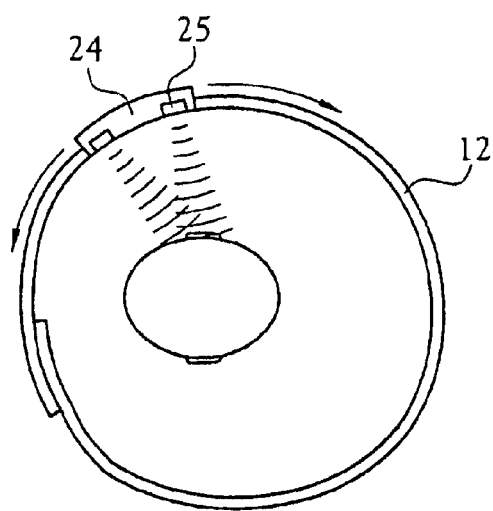
FIG. 3 is a plan view of a fetal educator strap in accordance with the present invention.
Figure 4:
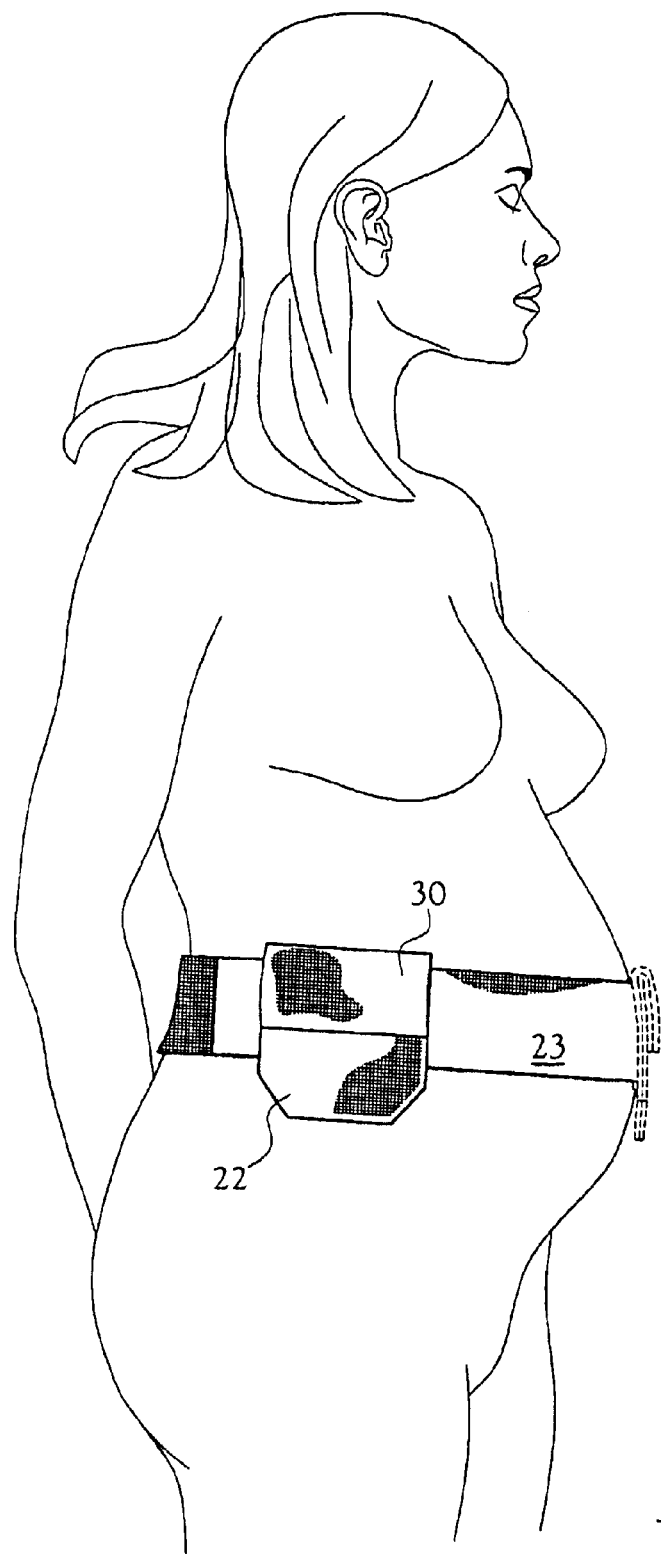
FIG. 4 is a perspective view of a pregnant woman wearing an alternative embodiment of a fetal educator strap in accordance with the present invention.

An apparatus is provided for attaching a sound generator to the abdomen of a pregnant woman to allow 360° positioning of the sound generator, relative to a support belt, around the abdomen.

Referring to the drawings, in which like numbered items represent like items, there is disclosed a fetal educator strap 10. The strap 10 includes an elongated belt 12 having a first end 14 and an opposing second end 16. The belt 12 comprises an elastic material, preferably about three inches in width. Adjacent to the first end 14 of the belt 12, a hook section 18 of a hook and loop attachment system is secured. Adjacent to the second end 16 of the belt 12, a loop section 20 of a hook and loop attachment system is secured. The hook section 18 is secured to the interior surface 21 of the belt 12 and the loop section 20 is secured on the outer surface 23 of the belt 12. The loop section 20 extends over a greater length of the belt 12 in order to allow adjustment of the effective circumference of the belt 12 when the hook section 18 is attached to the loop section 20. It will be recognized that the belt 12 may comprise multiple segments to permit greater amounts of adjustment in the circumference of the belt 12 for various sizes of women and degree of pregnancy.

A pouch 22 is slidably mounted upon the belt 12 by means of a sleeve 26. The sleeve 26 is about 3.5 inches in height in the depicted embodiment, wherein the belt is about three inches wide. In this manner, the pouch 22 is slidably adjustable to any position around the circumference of the belt 12. The pouch 22 and sleeve 26 comprise fabrics that are easily washable, such as cotton and polyester, for example.

The pouch 22 is sized to receive a portable sound generator 24 including one or more speakers 25. The sound generator 24 may comprise either an analog or digital apparatus capable of storing and reproducing desirable sounds, whether musical, oral or other naturally occurring sounds. As desired, the sound generator may include a microphone input (not shown) to allow the transmission of contemporaneous, i.e. non-stored, sounds. It may also include a set of headphones (not shown) to allow the mother to listen to the same sounds generated for the fetus. Pockets 28 may be secured on or in the pouch 22 to provide protected storage locations for media or batteries for the sound generator. A flap 30 is provided on the pouch 22 in order to close the pouch 22 and prevent accidental discharge of the sound generator 24 or other contents. The flap 30 may be attached to the pouch 22 by any suitable means including snaps, buttons or hook and loop attachment systems, for example.

In use, the sound generator 24 is inserted into the pouch 22. The speaker(s) 25 are directed inwardly, toward the sleeve 26, which is located on the interior surface 21 of the belt 12. The woman extends the first end 14 of the belt 12 through the sleeve 26 and then secures the hook section 18 to the loop section at a tension level that is most comfortable for her, ensuring that the belt 12 is sufficiently snug to prevent slippage from her abdomen. Thereafter, based upon her best estimate of where the head of the fetus is located, she adjusts the location of the pouch 22 to put the speaker(s) 25 as close to the head of the fetus as possible. In this manner, the volume and clarity of the generated sounds reaching the fetus are maximized for the volume level acceptable to the outer environment the woman is experiencing.

Thereafter, if the woman senses that the position of the fetus has changed, so that the speaker(s) 25 are no longer as close to the head of the fetus as possible, she slides the pouch 22 along the belt 12 to the position that is once again optimal. She does not need to adjust the whole belt 12 around her body, which can be difficult with snug-fitting elastic material. Also, if the woman is sitting or reposing and the sound generator 24 and pouch 22 are in an uncomfortable position, she can easily slide the pouch 22 to a more comfortable position.

The present invention also permits individualized sound generation for twins or triplets, for example. Using a single belt 12, two or more pouches 22 containing sound generators 24 may be slidably mounted to permit speakers 25 to be aimed at different locations within the womb. This embodiment permits similar sounds to be directed to two or more fetuses or, in the alternative, different sounds for each fetus.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A fetal educator strap comprising:

an elongated belt defining an interior surface and an exterior surface;

a first pouch slidably mounted upon said exterior surface of said belt;

a first sound generator, including a speaker, contained within said pouch, said speaker being directed toward said interior surface of said belt;

a second pouch mounted upon said exterior surface of said belt;

a second sound generator independent from said first sound generator, including a second speaker, contained within said pouch, said second speaker being directed toward said interior surface of said belt;

whereby said pouches containing said sound generators are slidable around the circumference of said belt.

2. The apparatus of claim 1 wherein said pouch is slidably mounted upon said belt with a sleeve.

3. The apparatus of claim 1 wherein said belt comprises an elastic material.

4. The apparatus of claim 1 wherein said belt is elongated to define a first end and a second opposing end and said first end is adjustably secured to said second end to adjust the circumference of said belt.

* * * * *